United States Patent
Patrizio et al.

(10) Patent No.: US 7,047,497 B2
(45) Date of Patent: May 16, 2006

(54) SYSTEM AND METHOD FOR DISPLAYING A LAYOUT OF GUI PROPERTIES PANEL

(75) Inventors: Jonathan Patrizio, San Francisco, CA (US); Eric Soderberg, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 640 days.

(21) Appl. No.: 09/984,371

(22) Filed: Oct. 30, 2001

(65) Prior Publication Data
US 2003/0095142 A1    May 22, 2003

(51) Int. Cl.
    *G06F 3/00*  (2006.01)
(52) U.S. Cl. .................. 715/760; 715/765; 717/105; 717/145; 717/168
(58) Field of Classification Search ............... 715/760, 715/762, 764, 765, 767, 776, 777; 717/120, 717/140, 145, 148, 168, 105
See application file for complete search history.

(56) References Cited

U.S. PATENT DOCUMENTS

| | | | | |
|---|---|---|---|---|
| 5,713,020 | A * | 1/1998 | Reiter et al. | 707/102 |
| 5,909,684 | A * | 6/1999 | Nelson | 707/103 R |
| 6,359,634 | B1 * | 3/2002 | Cragun et al. | 715/777 |
| 6,810,516 | B1 * | 10/2004 | Lauris | 717/105 |
| 2001/0037490 | A1 * | 11/2001 | Chiang | 717/2 |
| 2003/0101287 | A1 * | 5/2003 | Novik et al. | 709/318 |

OTHER PUBLICATIONS

U.S. Appl. No. 09/984,368, filed Oct. 2001, Patrizio.*
Bumpus, Winston, "Network Management and Administration", Distributed Management Task Force, Inc., p.p. 1-30, Apr. 3, 2001.
"Concepts and Terminology Important to Understanding WMI and CIM", www.eu.microsoft.com/hwdev/manageability/wmi-cim.htm, p.p. 1-9, Apr. 23, 1999.

* cited by examiner

*Primary Examiner*—Raymond J. Bayerl
*Assistant Examiner*—Dennis G Bonshock (57) ABSTRACT

Mechanism for displaying a layout of graphic user interface properties in a panel. The data is stored in managed object format (MOF) files and defines how the data to be displayed is interrelated. The generic mechanism defines the layout of interrelated object properties, where the layout of similar panels appear differently based on the type of the object of focus. An object is associated with a defined set of properties that may correspond to properties of other objects, as well. The system isolates information that determines the look and feel of status and property layout displays of a GUI into one file. This file can be quickly edited to change the appearance when needed. The application source code utilizes a class schema and the modifiable file is read in and processed when the application is launched. Further changes require the application to be restarted to read in the modified file.

15 Claims, 10 Drawing Sheets

PTST_bass Cluster Property Sheet

Cluster: PTST_bass

General | Packages | Nodes | Network

Packages configured in this cluster. Select a row.

| Package | Status | On Node | Pkg Auto Run | Failover Policy |
|---|---|---|---|---|
| PACKAGE 1 | up | crater | enabled | MIN PACKAG... |
| PACKAGE 1x | down | not-applicable | enabled | CONFIGURE... |
| PACKAGE 1x Id | up | bass | disabled | CONFIGURE... |
| PACKAGE2 | up | crater | disabled | CONFIGURE... |
| PACKAGE2x | up | bass | disabled | CONFIGURE... |

Nodes configured for the selection package.

| Node | Status in Cluster | Node Order | Node Switching |
|---|---|---|---|
| bass | up | 1 | enabled |
| crater | up | 2 | enabled |

[ Export... ] [ Export All ] [ Help ] [ OK ]

Done.

Cluster: PTST_bass

| General | Packages | Nodes | Network |

Nodes in this cluster. Select a row.

| Node | Status in Clus... | Host Status | OS Version | SG Version |
|---|---|---|---|---|
| bass | up | up | HP-UX B.11.00 | A.11.12 |
| crater | up | up | HP-UX B.11.00 | A.11.12 |

Packages configured on the Select a row to see more information on this node

| Package | StatusOn Node | Pkg Auto Run | Node Switching |
|---|---|---|---|
| PACKAGE 1 | up | enabled | enabled |
| PACKAGE 1x Id | down | enabled | disabled |
| PACKAGE 1x | down | disabled | disabled |
| PACKAGE2 | up | disabled | enabled |
| PACKAGE2x | down | disabled | |

[ Export... ] [ Export All ] [ Help ] [ OK ]

Done.

FIG. 9A  Layout for Property Sheets

FIG. 9B

SYSTEM AND METHOD FOR DISPLAYING A LAYOUT OF GUI PROPERTIES PANEL

CROSS REFERENCE TO RELATED APPLICATIONS

This application is related to U.S. patent application Ser. No. 09/984,361 to Inna Lauris, entitled "MECHANISM ALLOWING SEPARATION OF GRAPHICAL DISPLAY OF OBJECT STATUS FROM UNDERLYING DATA", and U.S. patent application Ser. No. 09/984,368 to Jonathan Patrizio and Eric Soderberg, entitled "SYSTEM AND METHOD FOR TABLE ROW SELECTION IN A GUI DISPLAY", both applications filed concurrently and assigned to a common assignee, and herein incorporated by reference in their entirety.

TECHNICAL FIELD

The technical field relates to a graphical display of data, and more particularly to a mechanism for displaying a layout of graphic user interface properties in a panel. The data is stored in managed object format (MOF) files and defines how the data for display is interrelated.

BACKGROUND

The Data Management Task Force (DTMF) developed the Common Information Model (CIM) in 1996 to provide a common way to share management information enterprise wide. The CIM schema provides models for various implementations to describe management data in a standard format. A number of graphic user interface (GUI) applications have been developed and deployed which take advantage of the CIM architecture.

According to a presentation by Winston Bumpus of the DTMF presented at the *DTMF Comdex Management Presentation*, Apr. 3, 2001, entitled, "Network Management and Administration", best of breed applications are used to manage network and system infrastructure. Different applications gather different pieces of data about the same resource. It is difficult to aggregate data from disparate management applications for: service level measurement; true "end-to-end" view of a network; fault diagnosis; capacity planning; and resource usage billing. It is currently a very manual process (human intensive), inaccurate, slow and cumbersome. Thus a number of products have been developed, and are currently evolving to solve these problems. The multi-computer/serviceguard (hereinafter "MC/ServiceGuard") product, a product that is managed through ServiceGuard Manager and available from Hewlett-Packard Company, is a specialized facility for protecting mission-critical applications from a wide variety of hardware and software failures. With this system, multiple (up to 16-nodes) systems are organized into an enterprise cluster that delivers highly available application services to local area network (LAN) attached clients. ServiceGuard Manager is the management graphical user interface that can be used to monitor the health of each node and quickly respond to failures in a way that minimizes or eliminates application downtime. Status and information gathered about the network is presented to the user (network administrator) via a GUI.

The look and feel of a graphical user interface (GUI) is very subjective. User feedback is therefore essential for a GUI to be successful. It is advantageous to have a method for changing display appearance based on client/user feedback. Data indicating status and properties of objects monitored by the GUI process are strongly interrelated and can be presented in a variety of different ways. Further, addition/deletion of object types or relationship among the objects results in necessary modifications of the GUI layout in order to present the data to the user in a logical manner.

Graphical status displays used in the prior art GUIs to display status or properties of objects are encapsulated in source code. Thus, to change the GUI layout, or add/delete tabs or tables in a window, the developer is required to modify the source code and recompile the application code. This makes modification of the GUI layout slow and cumbersome because of the recoding and recompilation necessary. Moreover, each time source code is modified and recompiled, the risk of introducing new bugs (errors) into the GUI is increased.

SUMMARY

It is an aspect of the present invention to reduce turn-around time to implement desired changes in a graphical display.

It is another aspect to provide a method for customizing the display characteristics of a graphic user interface (GUI) for various users.

It is yet another aspect of this invention to provide a generic mechanism to allow the easy modification of a visual layout of a GUI.

It is yet another aspect of this invention to provide a generic mechanism to define the layout of interrelated object properties, where the layout of similar panels appear differently based on the type of the object of focus. An object is associated with a defined set of properties that may correspond to properties of other objects, as well. The layout of this information appears differently depending on the object of focus.

These and other aspects and embodiments of the invention are achieved in a system that isolates all of the information that determines the look and feel of status and property layout displays of a GUI into one file. This file can be quickly edited to change the appearance when needed. The application source code utilizes a class schema and the modifiable file is read in and processed when the application is launched. Further changes require the application to be restarted to read in the modified file.

According to one embodiment of the invention, a class schema is identified which defines the layout components of the GUI that should be modifiable. The class schema and the corresponding class instances are defined in managed object format (MOF) files. MOF files follow a standard format that is well known to those skilled in the art. It will be apparent to one skilled in the art that as the CIM technology evolves, other formats might be used.

DESCRIPTION OF DRAWINGS

The invention will be described in detail in the following description of preferred embodiments with reference to the following FIGURES wherein.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In the present invention, a system is defined that isolates all of the information that determines the look and feel of property displays of a GUI into one file. In an illustrative embodiment the present invention is integrated with the MC/ServiceGuard clustering solution product, available from Hewlett-Packard Company. MC/ServiceGuard uses a GUI which consists of a tree and a map panel. Each object shown in the map or tree can be the focus object. Further, information corresponding to a focus object can be displayed in property sheet panels, as will be described in more detail hereinbelow.

Figure 1:
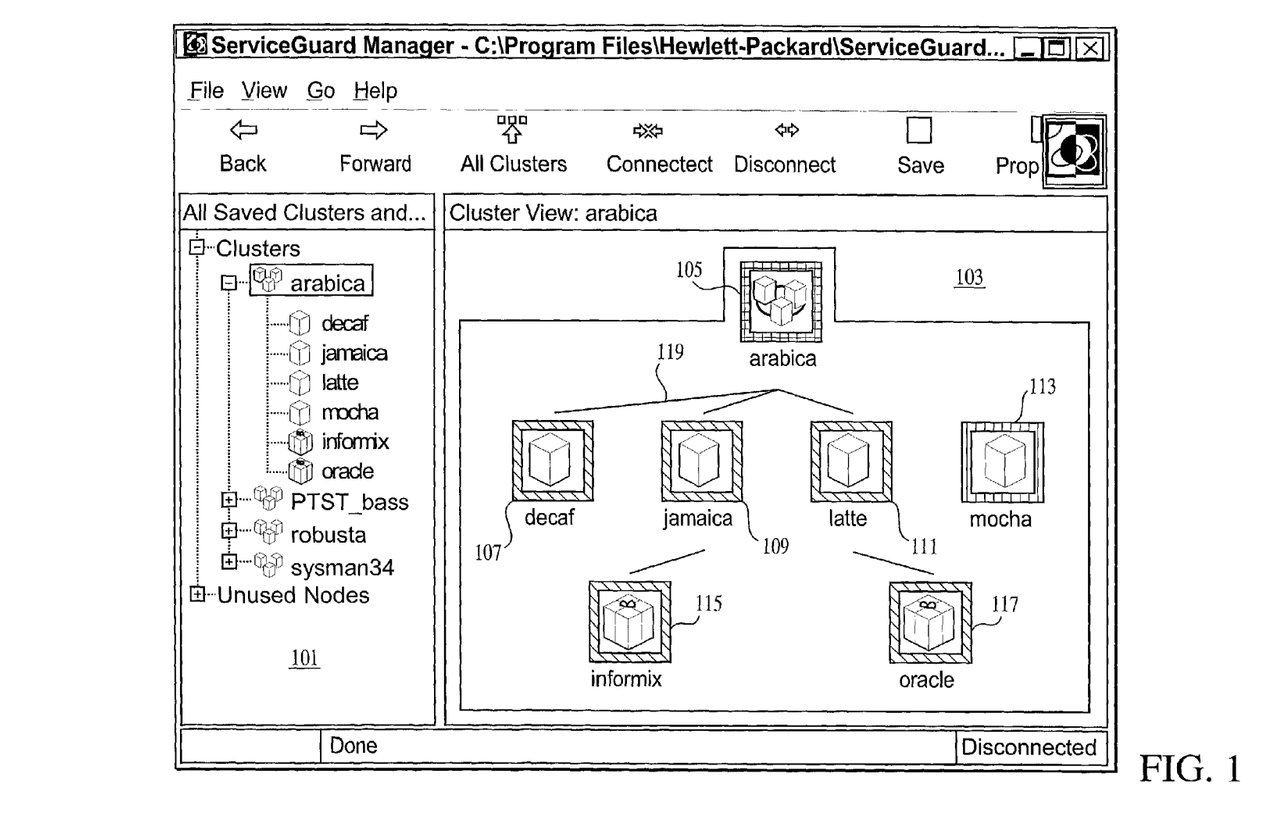
FIG. 1 is a screen shot of an exemplary top level screen of a ServiceGuard Manager product.

Referring now to the drawings, and in particular to FIG. 1, there is shown an exemplary top level screen shot of the ServiceGuard Manager product. The left panel shows a tree of clusters, nodes and packages monitored by the MC/ServiceGuard clustering product. The right panel 103 shows a hierarchical map of these objects (clusters, nodes and packages) and how they are interrelated, with a specific focus on the cluster named arabica 105, as highlighted in left panel 101. The right panel or map view 103 shows user-selectable levels of the clusters, nodes and packages in the monitored system. In this exemplary view, arabica 105 has four (4) nodes: decaf 107, jamaica 109, latte 111, and mocha 113. There are also two (2) packages associated with the arabica cluster: informix 115 and oracle 117. The nodes decaf 107, jamaica 109, and latte 111 are connected to the arabica cluster 105, as shown by the lines 119. The node mocha 113, however, is not connected to the cluster.

Figure 2:
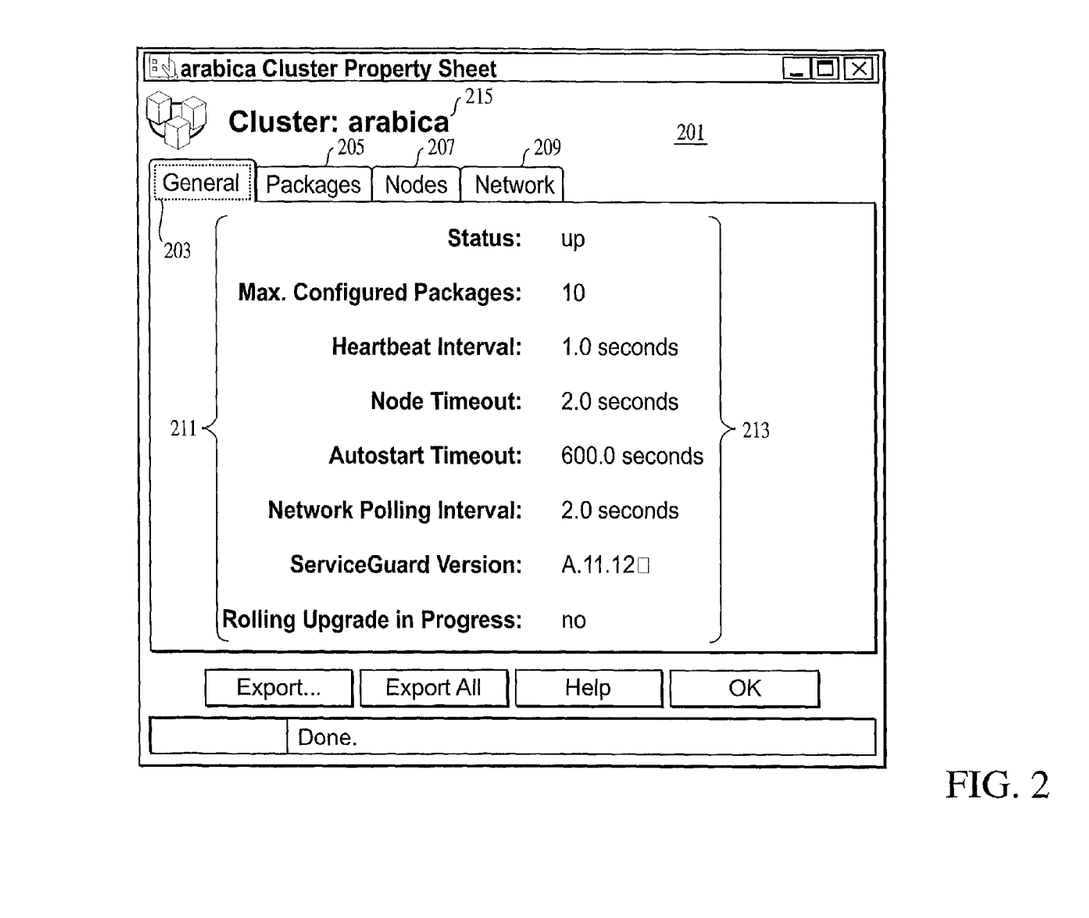
FIG. 2 is a screen shot of a General tab of a cluster property sheet.

There are a number of properties associated with the exemplary object illustrated in FIG. 1. Referring now to FIG. 2, there is shown a property sheet 201 associated with the arabica cluster 105. As is understood in the art, a property sheet is a tabbed dialog pane, each of which illustrates various properties of that cluster. In this exemplary layout, there are four tabs associated with the arabica cluster property sheet: General 203, Packages 205, Nodes 207, and Network 209. The General tab 203 is shown on top, in this case, illustrating a particular set of information for the arabica cluster 105 described in more detail below.

With reference again to FIG. 2, there are two types of tabs within a given property sheet. First, there is just the general list-type structure with key value pairs. This is a simple tabbed dialog pane, as illustrated in FIG. 2. The left hand side of the given property sheet, designated in FIG. 2 by the reference numeral 211 is a component that might be a cluster status or a cluster name or a package name. The corresponding right hand side 213 would contain respective values thereof. The actual instance data name of a particular cluster name 215 is shown, in this case, arabica.

There is a more complicated pane which is a tabular type of pane. Sometimes tabular panes have a single table therein. Often times, however, there are multiple tables which are in some way related. A particular property sheet tabbed pane might require a multi-valued instance of data. For the arabica cluster 105, for example, the pane would have a Packages tab 205.

Figure 3:
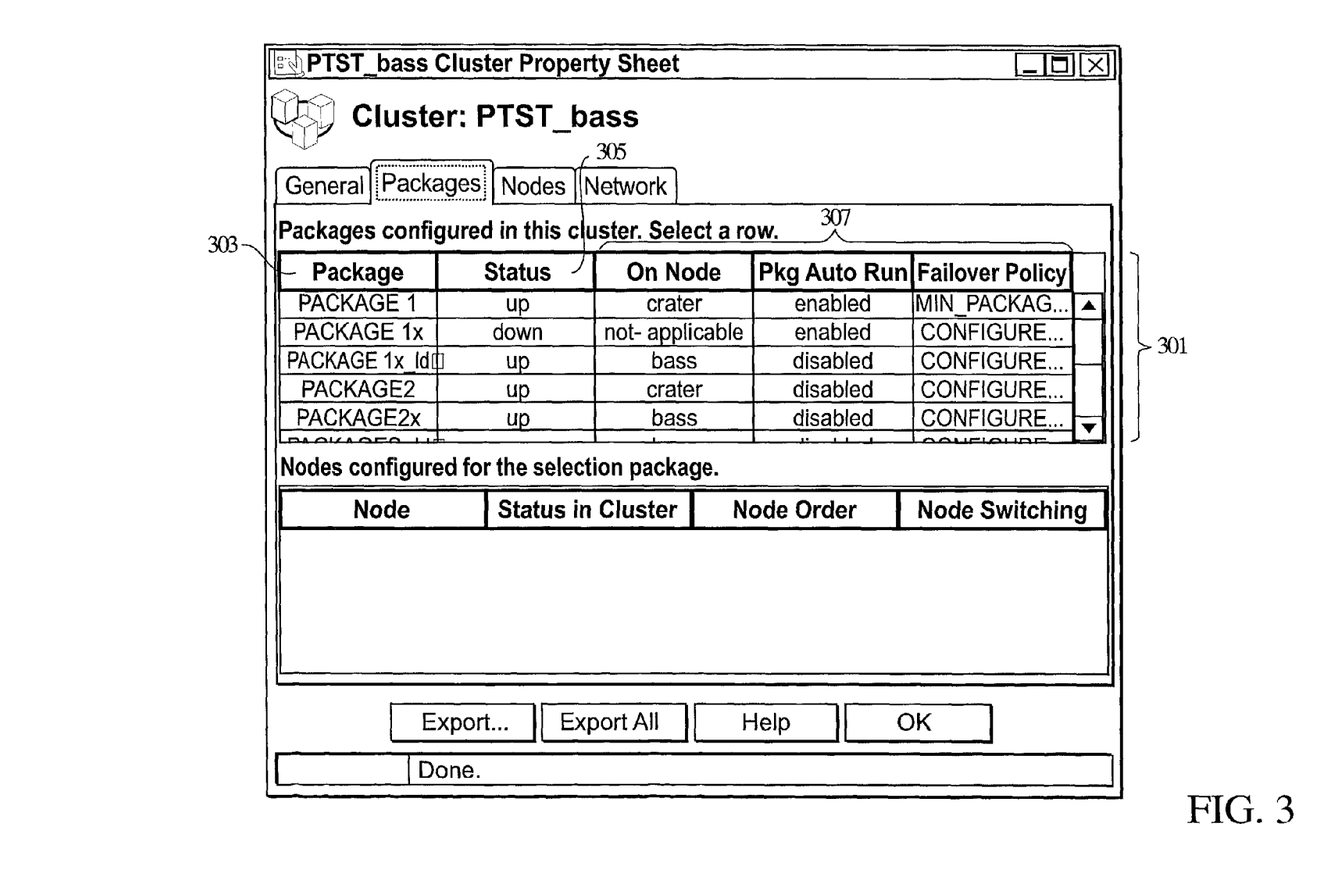
FIG. 3 is a screen shot of a Packages tab of a cluster property sheet.

Referring now to FIG. 3, there is shown the Packages tabbed pane for the cluster property sheet. All of the packages that are configured for and currently running on that particular cluster are shown within a package table generally designated by the reference numeral 301. The respective packages are, represented as a table because there are multiple instances of the same attributes. In this exemplary layout, the attributes displayed are: the package name 303, the package status 305, and all the attributes of a particular package, generally indicated by the reference numeral 307, of interest to a person given information about that particular package.

Figure 4:
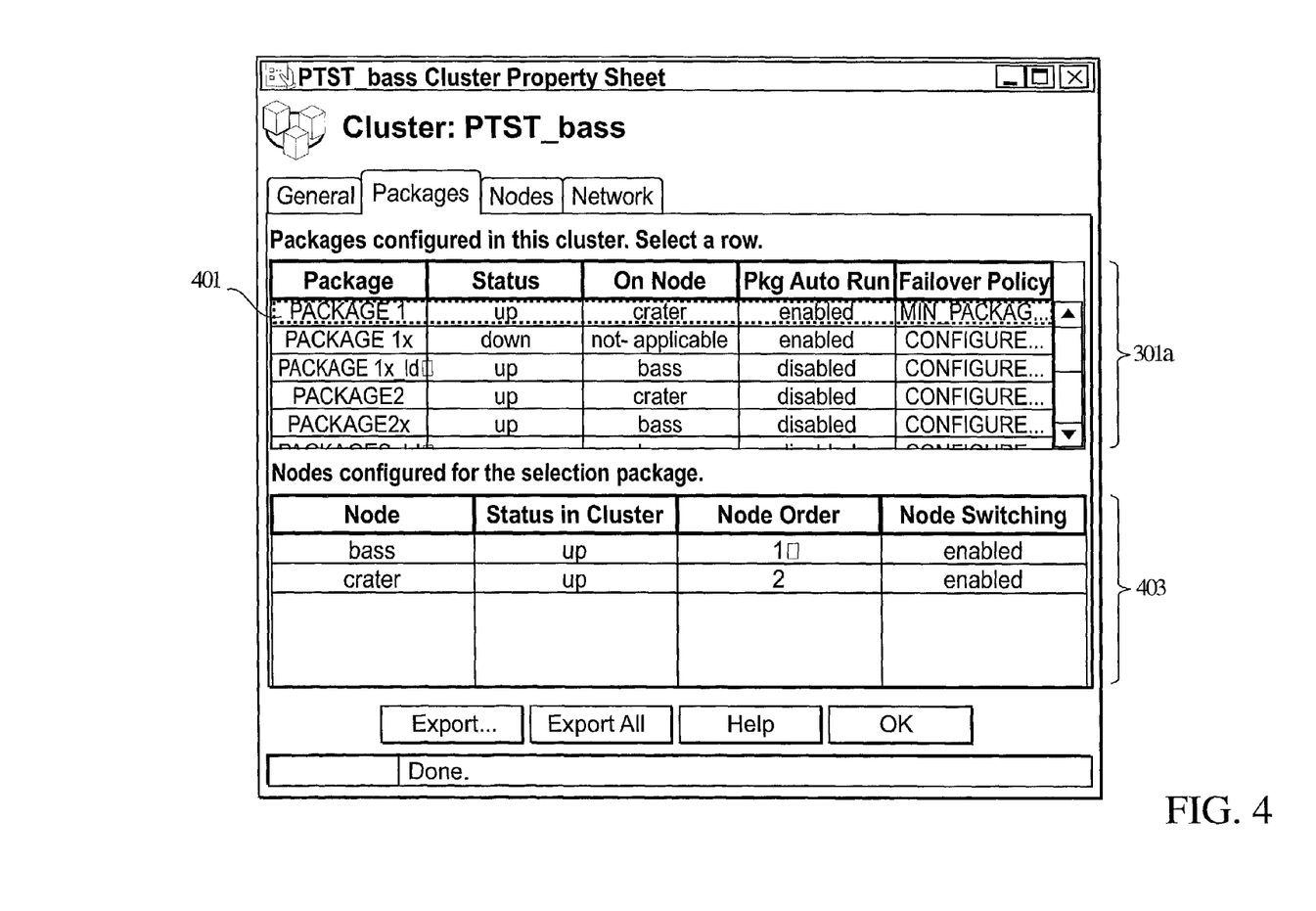
FIG. 4 is a screen shot of a Packages tab of a cluster property sheet with a selected package of focus.

Referring now to FIG. 4, there is shown the Packages tabbed property sheet pane with a Package row selected, i.e., package 401. If more specific information related to a package shown in the package table 301a is desired, the user selects or highlights a row in that table. A preferred method for selecting is pointing and then clicking to the desired package using a pointing device, such as a mouse. Other methods, for instance keyboard navigation, may be used. Once a row has been selected, a node table 403 is populated with appropriate data. The layout of the top package table and its relationship to the bottom node table are defined in a managed object file (MOF) file described in more detail. In this exemplary layout, a selection of a package row shows the nodes configured for the selected package, as well as related status data.

Figure 5:
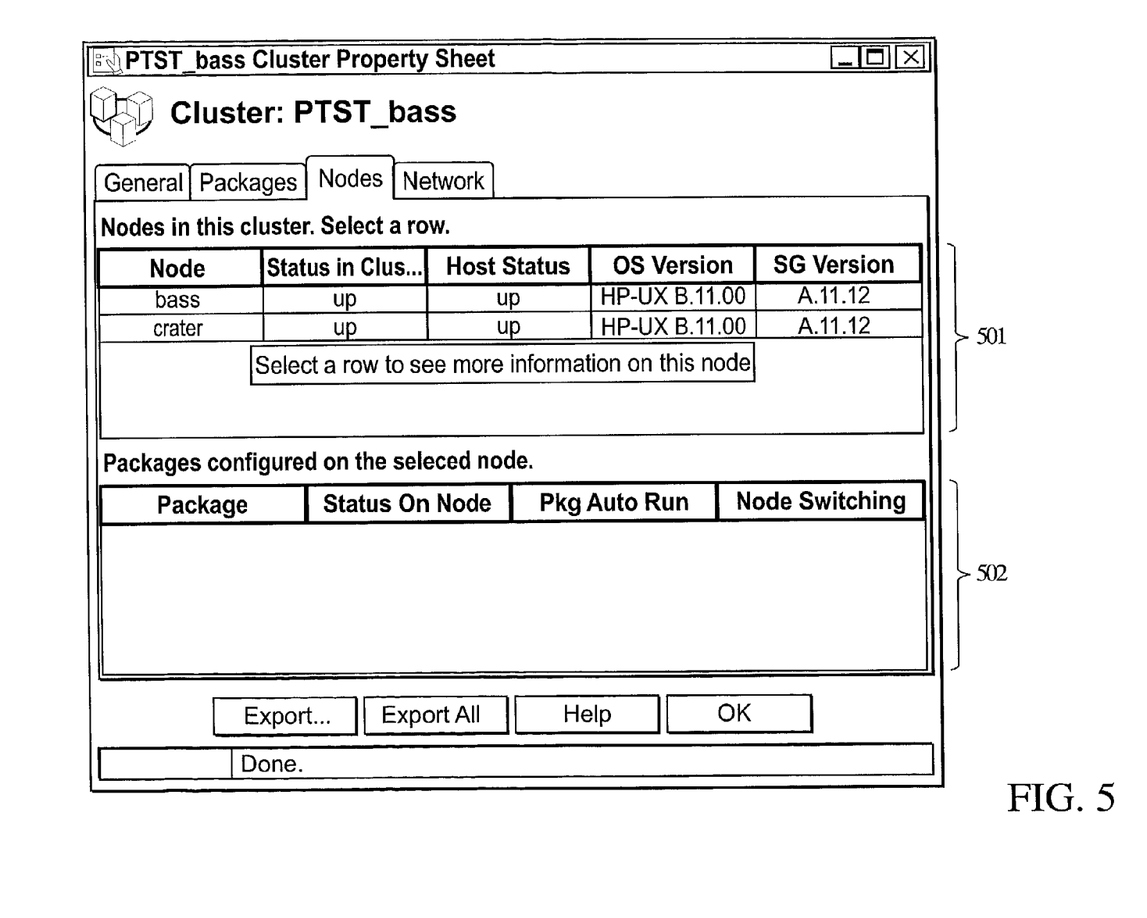
FIG. 5 is a screen shot of a Nodes tab of a cluster property sheet.
Figure 6:
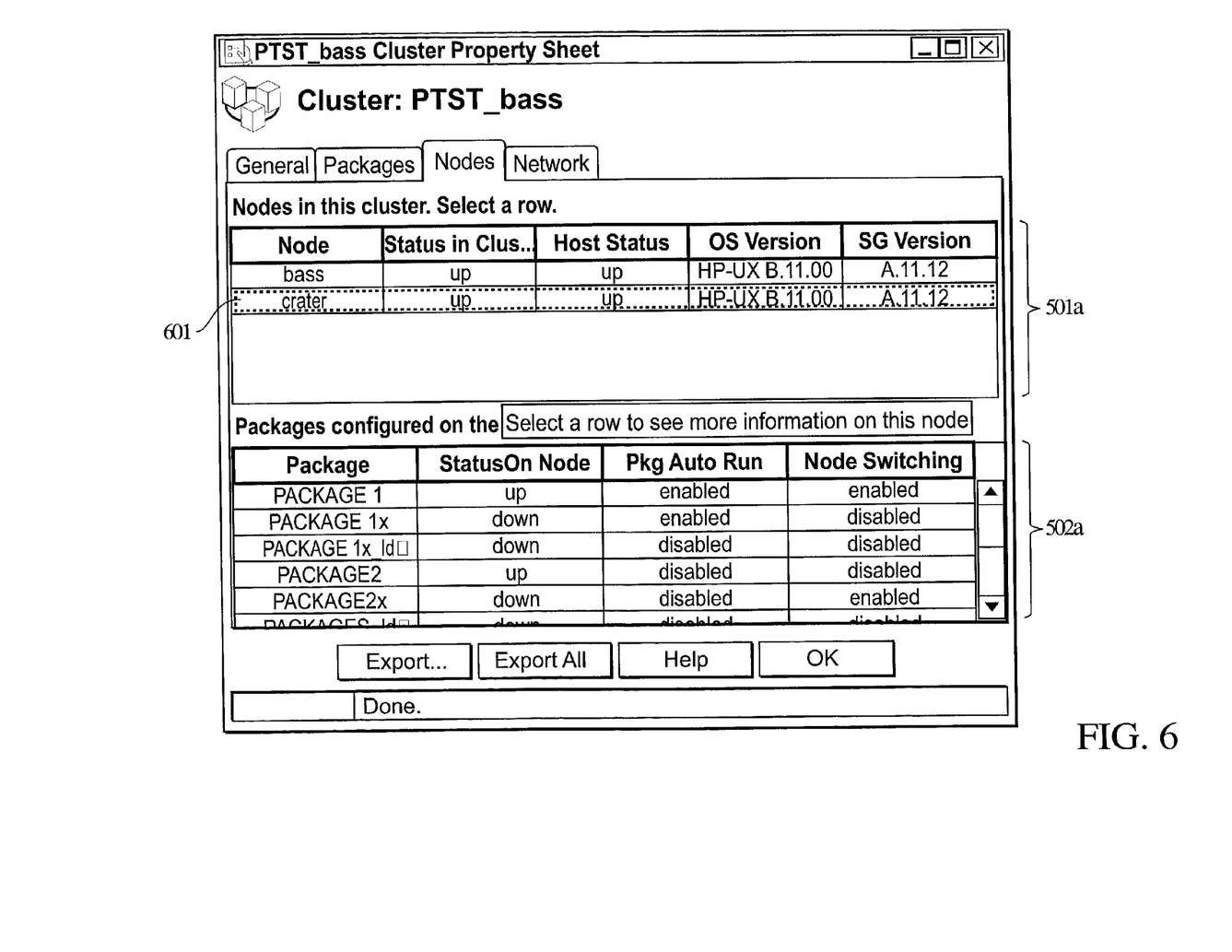
FIG. 6 is a screen shot of a Nodes tab of a cluster property sheet with a selected node of focus.

Referring to FIG. 5, there is shown the Nodes tabbed property sheet pane with no rows selected. A top node table 501 shows the nodes contained within the cluster of focus. The user can select a specific node (click on its row) to populate a lower packages table 502, as shown in FIG. 6. Referring now to FIG. 6, the lower packages table 502a shows the packages configured on the selected node row, i.e., crates in the upper node table 501a. It can be seen that the data presented for the node property sheet tab and the package property sheet tab contain similar data, but presented with a different focus.

Figure 7:
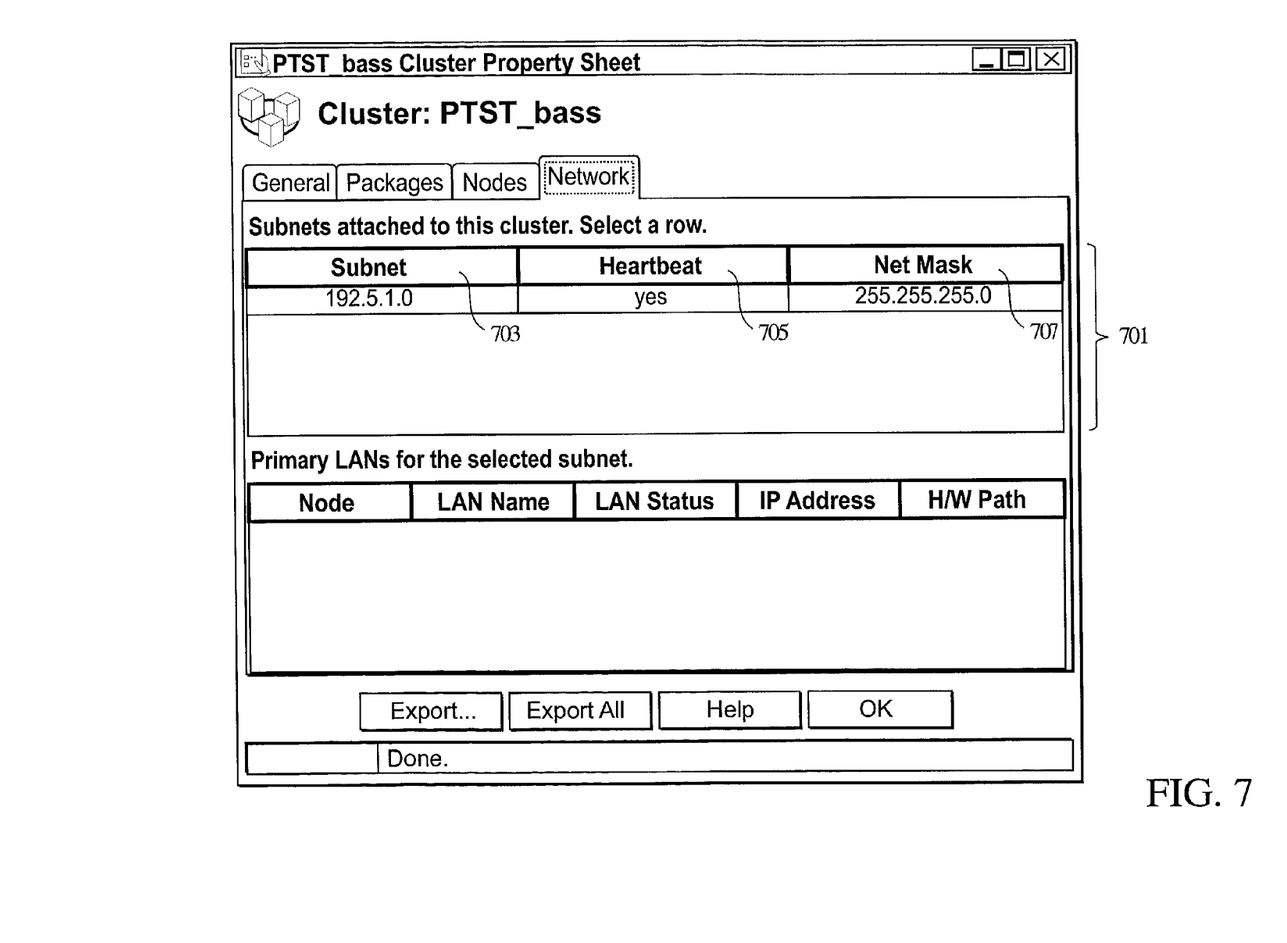
FIG. 7 is a screen shot of a Network tab of a cluster property sheet.
Figure 8:
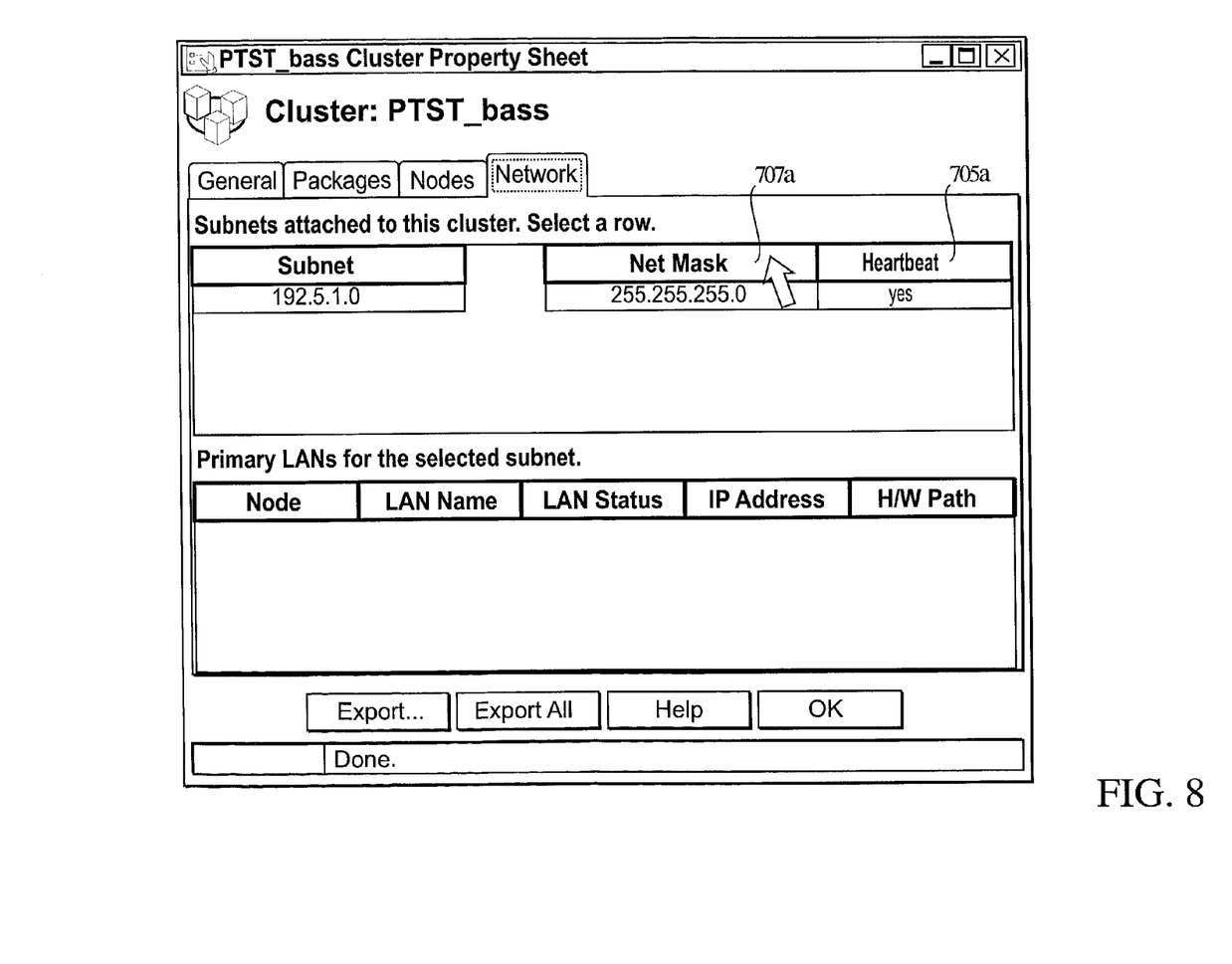
FIG. 8 is a screen shot of a Network tab of a cluster property sheet showing a modified column layout.

It is also possible for the user to modify some aspects of the GUI layout while the application is running. Referring now to FIG. 7, there is shown the Networks tabbed property sheet. A top subnets table 701 presents subnets on the cluster. There are three items of information presented for each row: subnet 703, heartbeat 705, and net mask 707. It is possible for the user to view this data in a different column order, if desired. For example, referring now to FIG. 8, the user switches the order of the second and third columns, i.e., heartbeat 705 and net mask 707, merely by dragging the column header to a different location. In this case, column net mask 707a is dragged from the third column in that row to the second. FIG. 8 shows the column net mask 707a in the process of being dragged. Column heartbeat 705a automatically moves to take the third column position, even before the user has dropped the Column net mask 707a to its final location.

As the monitored system becomes more complex, the user/network administrator may prefer to view properties and attributes of the various system objects differently. For instance, another object might be defined which would require the cluster property sheet to have five tabs rather than the four in the above illustrated embodiment. Therefore, the present invention defines a method and system which allows separation of the layout of the graphical display of object information from the underlying data. Instead of a rigid sequential ordering, the data is stored in managed object format (MOF) files which define the layout for display.

The application source code utilizes a class schema and the modifiable file is read in and processed when the application is launched. Further changes require the application to be restarted to read in the modified file.

According to one embodiment of the invention, a class schema is identified which defines the visual components of the GUI that should be modifiable. The class schema and the corresponding class instances are defined in managed object format (MOF) files. MOF files follow a standard format that is well known to those skilled in the art. It will be apparent to one skilled in the art that as the Common Information Model (CIM) technology evolves, other formats might be used.

An advantage of the present invention is derived from the ability to generalize the set of architecture and design of the property sheets so more complex combinations of tables and left-right value pairs could be rendered by the application. The property sheet is described in a general way in the MOF file. A managed object format file is really an ASCII representation of classes and then their instances. In the present invention, the MOF file contains control data that could then describe the ServiceGuard Manager program internally. It defines how to render and represent all the different attributes and features in which a customer might have interest.

Another feature of the present invention is gathering layouts and organizational information into a managed object format. In order to structure the MOF, a UML (unified modeling language) class diagram is developed. This class diagram is an illustration showing how the MOF file works and what would be contained inside this MOF file. For example, for the cluster property sheet described above, there is a MOF file which contains all of the necessary information representing that General tab, the cluster Packages tab, the Nodes tab, and the Network tab. Inside of a file that is internal to ServiceGuard Manager there is a MOF file which contains a description telling the program how a cluster property sheet should be rendered.

If a change to the layout of a cluster property sheet is required, the modifications are added to the MOF file. For instance, for an additional tab, further descriptions describing another tab are added to the MOF file and the code in the program would not need to be modified. Thus, the instances of the classes are modified in the MOF file, but the schema maintains generality and need not be modified. In one embodiment, the application is programmed using JAVA™ (JAVA is a trademark of Sun Microsystems, Inc.). The JAVA™ code that exists would read that definition file and would automatically render a new tab. Traditionally, the way this is done is to hard-code it in source code. Thus, JAVA™ code to specifically render all of the components needed for the cluster property sheet would need to be written and reintegrated into the existing code. In the preferred embodiment, the desired changes are entered into a pre-processor which checks the syntax and then generates the modified MOF file.

Figures 9, 9A:
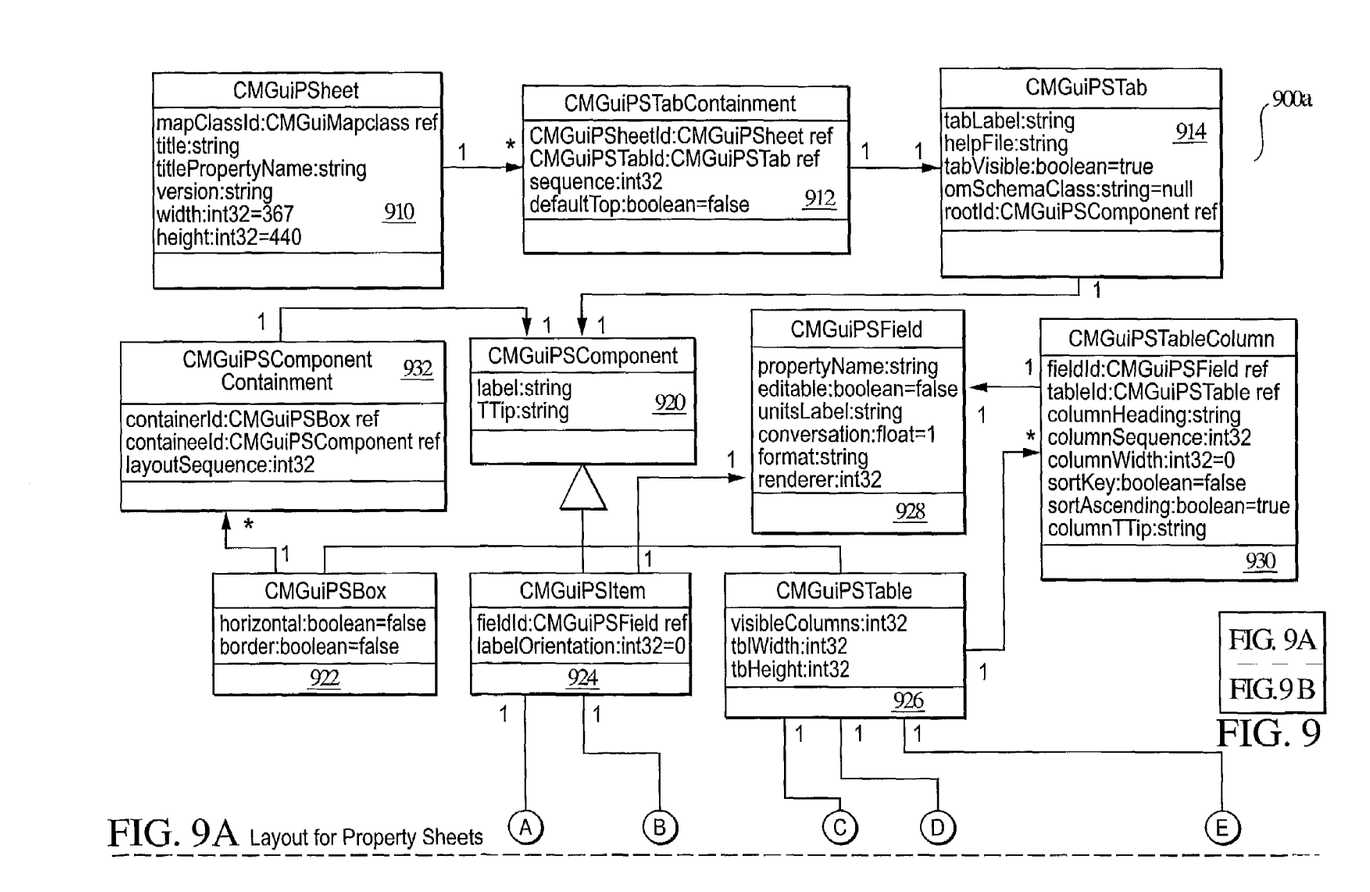
FIGS. 9A and 9B show a class schema defining a layout for property sheets.
Figure 9B:
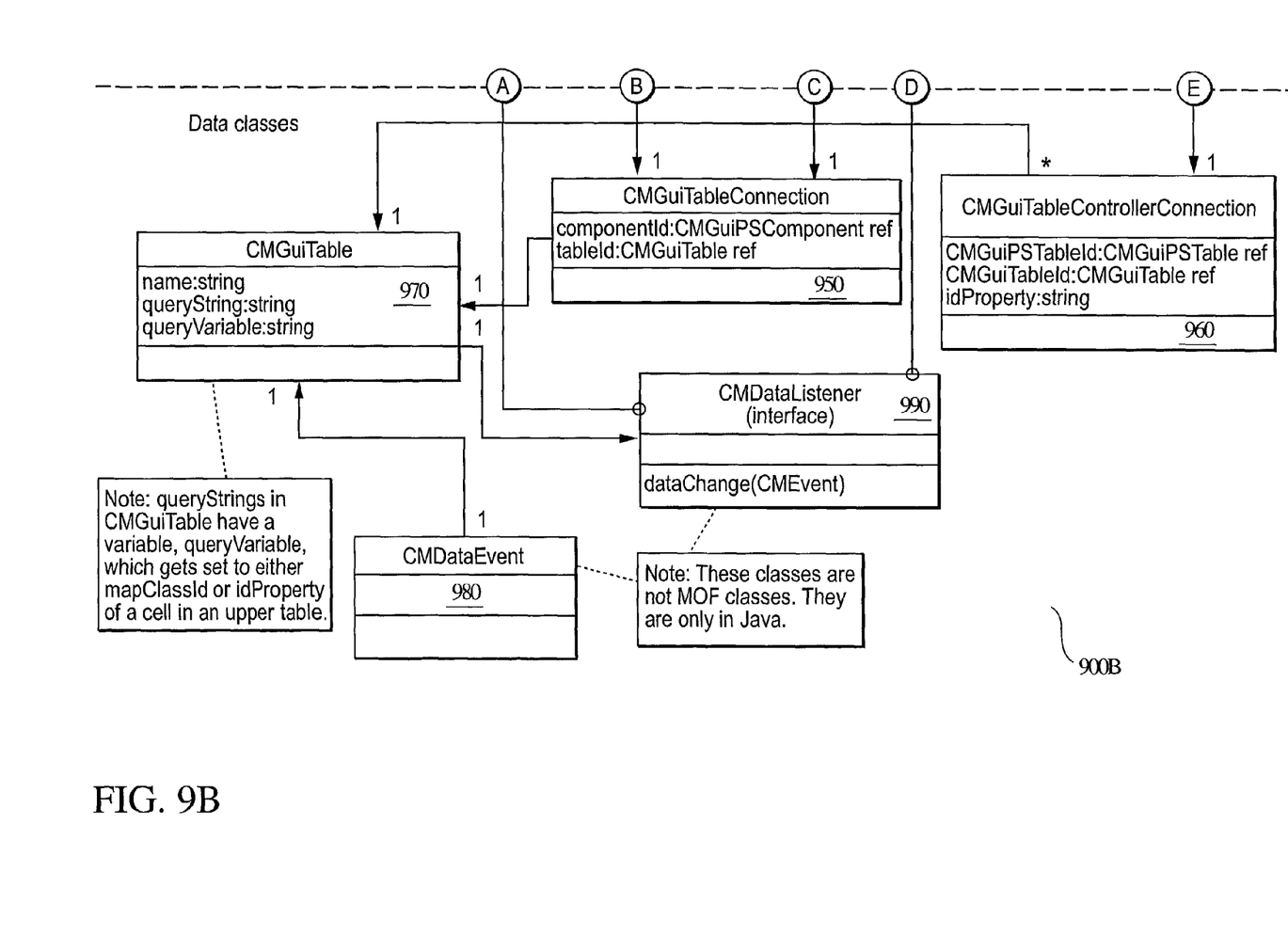

Referring now to FIGS. 9A and 9B, there is shown a class schema, generally designated by the reference numeral 900a and 900B, for the property sheets, pursuant to the principles and teachings of the present invention. Referring specifically to FIG. 9A, class CMGuiPSheet 910 defines the general property sheet, and has a class identifier (mapClassId), a title string, a title property name string, a version and a default height and width, as illustrated in the FIG. 9A. In the exemplary embodiment, there are three objects having property sheets: cluster, node and package. Therefore, there will be three instances of the CMGuiPSheet class in the MOF file that holds the instances of the defined classes. If a new object is defined, the schema 900a requires no modification. The instance MOF file would be modified to add the new property sheet instance and associated class instantiations.

The CMGuiPSheet class has a one-to-many relationship with a CMGuiPSTabContainment class 912, which defines a tab for containment within the property sheet. A sheet may have multiple tabs. The sequence of tabs is also defined here. The sequence defines the order in which the tabs appear (top to bottom). The actual sequence is identified in the instance MOF file. Because there is a one-to-many relationship, a property sheet defined to have four tabs will have four instances of the containment class. For instance, in an exemplary embodiment, there are several tab containment instances for a cluster property sheet. The MOF file would therefore include the following instantiations:

```
instance of CMGuiPSheet {
    id = "CMGuiPSheet:SGCluster";
    mapClassID = "SGCluster";
    title = "PSMOF_SGCluster_title";
    titlePropertyName = "name";
    version = "010502"
    width = 480;
    height = 420;
};
instance of GMGuiPSTabContainment {
    id =
"CMGuiPSTabContainment:CMGuiPSheet:SGCluster+CMGuiPSTab:CMGuiPSh
eet:SGCluster:1";
    CMGuiPSheetID "CMGuiPSheet:SGCluster";
    CMGuiPSTabID = "CMGuiPSTab:CMGuiPSheet:SGCluster:1";
    sequence = 1;
    defaultTop = true;
};
```

-continued

```
instance of CMGuiPSTabContainment {
    id =
"CMGuiPSTabContainment:CMGuiPSheet:SGCluster+CMGuiPSTab:CMGuiPSh
eet:SGCluster:2";
    CMGuiPSheetID = "CMGuiPSheet:SGCluster";
    CMGuiPSTabId = "CMGuiPSTab:CMGuiPSheet:SGCluster:2";
    sequence = 2;
    defaultTop = false;
};
instance of CMGuiPSTabContainment {
    id =
"CMGuiPSTabContainment:CMGuiPSheet:SGCluster+CMGuiPSTab:CMGuiPSh
eet:SGCluster:3";
    CMGuiPSheetID = "CMGuiPSheet:SGCluster";
    CMGuiPSTabID = "CMGuiPSTab:CMGuiPSheet:SGCluster:3";
    sequence = 3;
    defaultTop = false;
};
instance of CMGuiPSTabContainment {
    id =
"CMGuiPSTabContainment:CMGuiPSheet:SGCluster+CMGuiPSTab:CMGuiPSh
eet:SGCluster:4";
    CMGuiPSheetID = "CMGuiPSheet:SGCluster";
    CMGuiPSTabId = "CMGuiPSTab:CMGuiPSheet:SGCluster:4";
    sequence = 4;
    defaultTop = false;
};
```

Other instances of a CMGuiPSTablContainment may be created in the MOF file. If the tabVisible Boolean which is part of the related class CMGuiPSTab is FALSE, then this tab would not be visible to the user. In this way, the GUI can be made more generic, allowing tabs to be easily made visible or invisible depending on the needs or authorization level of a user. This provides a way to conditionally turn-on tabs for different customers, if desired. Therefore, the instances that are seen in the MOF file that don't appear when ServiceGuard Manager is run, have simply been disabled.

The property sheet for a node also has several tab containment instances. The MOF file would therefore include the following instantiations:

```
instance of CMGuiPSheet {
    id = "CMGuiPSheet:SGNodePackage";
    mapClassId = "SGNodePackage";
    title = "PSMOF_SGNodePackage_title";
    titlePropertyName = "name";
    version = "010502"
    width = 520;
    height = 440;
};
instance of CMGuiPSTabContainment {
    id =
"CMGuiPSTabContainment:CMGuiPSheet:SGNodePackage+CMGuiPSTab:CM
GuiPSheet:SGNodePackage:1";
    CMGuiPSheetID = "CMGuiPSheet:SGNodePackage";
    CMGuiPSTabId = "CMGuiPSTab:CMGuiPSheet:SGNodePackage:1";
    sequence = 1;
    defaultTop = true;
};
instance of CMGuiPSTabContainment {
    id =
"CMGuiPSTabContainment:CMGuiPSheet:SGNodePackage+CMGuiPSTab:CM
GuiPSheet:SGNodePackage:2";
    CMGuiPSheetID = "CMGuiPSheet:SGNodePackage";
    CMGuiPSTabId = "CMGuiPSTab:CMGuiPSheet:SGNodePackage:2";
    sequence = 2;
    defaultTop = false;
};
instance of CMGuiPSTabContainment {
    id =
"CMGuiPSTabContainment:CMGuiPSheet:SGNodePackage+CMGuiPSTab:CM
GuiPSheet:SGNodePackage:3";
    CMGuiPSheetID = "CMGuiPSheet:SGNodePackage";
    CMGuiPSTabID = "CMGuiPSTab:CMGuiPSheet:SGNodePackage:3";
    sequence = 3;
    defaultTop = false;
};
```

-continued

```
instance of CMGuiPSTabContainment {
    id =
"CMGuiPSTabContainment:CMGuiPSheet:SGNodePackage+CMGuiPSTab:CM
GuiPSheet:SGNodePackage:4";
    CMGuiPSheetID = "CMGuiPSheet:SGNodePackage";
    CMGuiPSTabId = "CMGuiPSTab:CMGuiPSheet:SGNodePackage:4";
    sequence = 4;
    defaultTop = false;
```

With reference again to FIG. 9A, the CMGuiPSTabContainment class 912 has a one-to-one relationship with a CMGuiPSTab class 914. This class specifies that each tab has a label, associated help, and visibility flag. The main purpose of this class is to connect property sheets and tabs. An advantage of this method is that a particular style of tabs could be shared among different property sheets. Moreover, because the help string is associated with a tab, context sensitive help is available at the tab level rather than at just the property sheet level. The visibility flag allows a tab to be made invisible, if desired. This allows a set of users to be blind to some data for security, aesthetic or other reasons. Or more accurately, for a vendor or developer to control which of the tabs are seen by various customers. A tabVisible flag can easily be inverted from false to true to enable a particular customer to see the tab, without having to change their source code.

A CMGuiPSComponent class 920 is an abstract class type. In other words, CMGuiComponents are not actually displayed on the layout. What actually is displayed in the layout are items, boxes or tables. A box is a mechanism for grouping a number of components together. Thus, there is a circular route in the schema from the CMGuiPSComponent class 920 and CMGuiPSBox 922, CMGuiPSItem 924, and CMGuiPSField 926 classes. As shown by the schema diagram, boxes, items and tables are components. An item may have a field (one-to-one relationship) associated with it, as shown by CMGuiPSField class 928. A table has associated columns (one-to-many relationship) as shown by CMGuiPSTableColumn class 930. Boxes may contain other components, including other boxes, tables, or items, as shown by the one-to-many relationship between CMGuiPSBox class 922 and CMGuiPSComponentContainment class 932.

Because of this architecture, a layout may have an arbitrary number of boxes, contained within boxes, which contain combinations of items and tables. This a very general structure that allows a layout to have a box, which contains an item followed by another box, which could contain another table, which could then contain another table. Then the layout could have another box within that which could have three more items in it. It is a very general way of kind of organizing all of these different kinds of components. Furthermore, the box can specify the Boolean property horizontal which controls whether components within it are laid out side-by-side or top-to-bottom.

In the preferred embodiment, the data on the property sheets is populated using a method defined by the data class schema 900A and 900B, as shown in FIGS. 9A and 9B. Referring specifically to FIG. 9B, a connection between items and tables classes is shown to CMGuiTableConnection class 950. This is a one-to-one relationship and allows each item or table to identify where (from which table) it retrieves its data. The rendered value that an item or table displays is governed by the CMGuiPSField.propertyName field, which must select an column resulting from the evaluation of an SQL queryString encapsulated in CMGuiTable. To state this in an alternative way, all instance data is retrieved by running SQL queries and CMGuiTableConnection provides the JAVA code with a way to correctly select displayed data from a superset of data, resulting from running a particular SQL query.

The tables class is also connected to CMGuiTableControllerConnection class 960. This class controls the display of table data related to a selected row in the focus table, as described above. The CMGuiTableControllerConnection class 960 and the CMGuiTableConnection class 950 are also connected to CMGuiTable 970, which controls the querying of data, as described in the previous paragraph. The CMDataListenerInterface allows a component to receive CMDataEvents, arriving when changes to this data arise. This provides a mechanism for changing displayed data when underlying changes occur in the ServiceGuard Manager system. In this exemplary embodiment, the CMGuiTable 970 has a one-to-one relationship with CMDataEvent 980 and CMDataListener interface 990. In the preferred embodiment, these classes 980 and 990 are JAVA™ classes. It will be apparent to one skilled in the art that a variety of methods can be used to populate the layout with data.

The classes contain numerous properties, used by the Java code to control the layout. For example, to change the width and height of a particular property sheet, the width and height parameters are changed in the MOF file via the CMGuiPSheet instance for this property sheet. Its title (displayed at the head of the property sheet) is changed via the title field. It will be apparent to one skilled in the art that other modifications to the GUI layout can be effected using the method of the present invention, as desired. For instance, color, perspective, button type, etc. could be defined in the layout classes. A method for defining visual indicators in MOF files is described in concurrently filed U.S. patent application entitled, "Mechanism Allowing Separation Of Graphical Display Of Object Status From Underlying Data", supra.

The field CMGuiPSTabContainment.layoutSequence controls the ordering of tabs within a property sheet. The CMGuiPSComponentContainment.layoutSequence allows the components (boxes, items or tables) within the box to be re-ordered. As mentioned above, the CMGuiPSBox.horizontal flag can be used to control whether components within the box are laid out horizontally (side-by-side) or vertically (end-to-end). Table headings, tooltips and individual column names can be set via the MOF file by altering the fields of instances.

Having described preferred embodiments of a novel method for displaying a layout of GUI properties panel (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

The invention claimed is:

1. A system for displaying a layout for a graphical user interface properties panel, comprising:

a computing device capable of executing object-oriented computer programs;

a module comprising a GUI running on the computing device;

a first section of object-oriented computer code defining a layout schema for the GUI, the schema comprising class definitions for a tabbed containment class and component classes, and relationships among the defined classes, and the schema being stored in a managed object format (MOB file; and a second section of object-oriented computer code defining instances of classes for tabbed containment classes and component classes, wherein relationships between the GUI and layout of desired containments and components are modifiable by modifying the instances of classes in the MOF file without having to modify the layout schema, and wherein a desired modification is entered into a pre-processor that generates a modified MOF file.

2. The system as recited in claim 1, wherein a component class comprises at least one class in the group of classes of boxes, items and tables.

3. The system as recited in claim 2, wherein a table comprises at least one table column.

4. The system of claim 2, wherein a box can specify a Boolean property as horizontal so that components within the property are laid out side-by-side.

5. The system as recited in claim 1, wherein instances of the tabbed containment class correspond to tabbed sheets on a display, and the tabbed sheets are capable of being displayed in any sequence.

6. The system as recited in claim 5, wherein an instance of a tabbed sheets further comprises a first table, each row in a table row of the first table being associated with corresponding data for a second table.

7. The system as recited in claim 6, wherein the second table is populated with data upon selection of a row in the first table, wherein the data populated in the second table is modifiable by changing the instances of classes.

8. The system of claim 5, wherein an instance of a tabbed sheets further comprises multiple columns, the order of which can be modified by dragging a header of a column to a different location.

9. The system of claim 1, wherein the instances of classes can be modified to turn off a particular layout component so that the component is invisible to a user.

10. The system of claim 1, wherein references are embedded in the MOF file to allow a help system to dynamically reference a help content for a layout component, wherein modification of a reference to a new help page is accomplished by modifying an instance in the MOF file without recompiling source code.

11. A computer readable medium containing code sections for displaying a layout for a graphical user interface (GUI) properties panel, comprising:

a first code section of object-oriented computer code defining a layout schema for the GUI, the schema comprising class definitions for a tabbed containment class and component classes, and relationships among the defined classes, and the schema being stored in a managed object format (MOF) file; and a second code section of object-oriented computer code defining instances of classes for tabbed containment classes and component classes, wherein relationships between the GUI and layout of desired containments and components are modifiable by modifying the instances of classes in the MOF file without having to modify the layout schema, and wherein a desired modification is entered into a pre-processor that generates a modified MOF file, wherein a modified second code section represents a modified GUI layout and is read as input into the GUI at application launch time without recompilation of the GUI being necessary.

12. The computer readable medium as recited in claim 11, further comprising an additional code section comprising a GUI for running on the computing device.

13. A method for displaying a layout of graphical user interface (GUI) properties panel, comprising:

selecting a focus item on a display, wherein the focus item represents a focus object in memory, the focus object having corresponding data in memory, relationships between the focus object, the layout of the focus object in the GUI and focus object corresponding data being defined by a class schema, the schema comprising class definitions for a containment class and component classes, and relationships among the defined classes, and wherein instances of classes defined in the schema are defined in a modifiable managed object format (MOF file, the modifiable MOF file being read by the GUI at application launch time;

modifying the relationships between the GUI and layout of desired containments and components by modifying the instances of classes in the MOF file without having to modify the class schema, and wherein a desired modification is entered into a pre-processor that generates a modified MOF file; and displaying the corresponding data in a layout defined by the schema.

14. The method as recited in claim 13, wherein a component class comprises at least one class in the group of classes of boxes, items and tables.

15. A memory for storing data for access by a graphical user interface (GUI) application program being executed on a data processing system, comprising:

an object-oriented data structure stored in memory, the data structure including information related to a layout class schema for the GUI, the schema comprising class definitions for a tabbed containment class and component classes, and relationships among the defined classes, the class schema being utilized in compilation of the GUI, and the schema being stored in a managed object format (MOF) file; and a plurality of instances of classes, the classes being defined in the class schema, wherein the class instances are stored in the memory and correspond to tabbed containment classes and component classes, wherein relationships between the GUI and layout of desired containments and components are modifiable by modifying the instances of classes in the MOF file without having to modify the layout class schema, and wherein a desired modification is entered into a pre-processor that generates a modified MOF file,
wherein data in the memory are inputs to the GUI upon launching of the GUI application program, thereby avoiding recompilation of the GUI application program when the data in memory is modified.

* * * * *

UNITED STATES PATENT AND TRADEMARK OFFICE
CERTIFICATE OF CORRECTION

PATENT NO. : 7,047,497 B2 Page 1 of 1
APPLICATION NO. : 09/984371
DATED : May 16, 2006
INVENTOR(S) : Jonathan Patrizio et al.

It is certified that error appears in the above-identified patent and that said Letters Patent is hereby corrected as shown below:

IN THE SPECIFICATION

Column 3, line 37, after "panel" insert --101--

Column 9, line 48, after "This" insert --is--

IN THE CLAIMS

Claim 1, Column 11, line 20, delete "(MOB" and insert therefor --(MOF)--

Claim 13, Column 12, line 35, delete "(MOF" and insert therefor --(MOF)--

Signed and Sealed this

Sixteenth Day of October, 2007

JON W. DUDAS
*Director of the United States Patent and Trademark Office*